United States Patent [19]

Reutlinger

[11] 3,902,373

[45] Sept. 2, 1975

[54] DYNAMIC BALANCING MACHINE

[76] Inventor: Wolf-Dieter Reutlinger, Novalisstrasse 5, Darmstadt, Germany

[22] Filed: Mar. 13, 1973

[21] Appl. No.: 340,814

Related U.S. Application Data

[63] Continuation of Ser. No. 877,778, Nov. 18, 1969, abandoned.

[52] U.S. Cl. ............................................. 73/462
[51] Int. Cl. ................................................ G01m 1/22
[58] Field of Search ............. 73/462, 473, 475–477, 73/479

[56] References Cited
UNITED STATES PATENTS

| | | | |
|---|---|---|---|
| 2,131,602 | 9/1938 | Thearle | 73/462 |
| 2,289,074 | 7/1942 | Rushing et al. | 73/477 |
| 2,293,371 | 8/1942 | Van Degrift | 73/472 |
| 2,815,666 | 12/1957 | Pischel | 73/462 |

FOREIGN PATENTS OR APPLICATIONS

| | | | |
|---|---|---|---|
| 1,154,655 | 9/1963 | Germany | 73/462 |
| 878,637 | 10/1961 | United Kingdom | 73/462 |
| 895,338 | 5/1962 | United Kingdom | 73/462 |

*Primary Examiner*—James J. Gill
*Attorney, Agent, or Firm*—Gardiner, Sixbey, Bradford and Carlson

[57] ABSTRACT

Cyclical forces due to the out-of-balance of a rotating body on bearings are transmitted from the bearings to a vibratory beam at points of application corresponding to the distance between bearings. Force sensors engaging on the beam at points lying in two balancing-out planes detect forces in balancing-out planes to indicate weight correction necessary in each plane or predetermined radius, and phase indicating means responsive to rotation of the body and periodic forces on the sensors indicates angular position for the corrections. If the center of gravity of the body is not between the bearings and tends to tilt the beam, the force from one bearing position is applied in opposite direction on the beam with a corresponding reversal position of a sensor.

10 Claims, 4 Drawing Figures

DYNAMIC BALANCING MACHINE

This is a continuation, of application Ser. No. 877,778, filed Nov. 18, 1969, now abandoned.

DESCRIPTION OF THE PRIOR ART

Up until several years ago, devices used for the determination of attending unbalance due to axial deviation of rotating bodies were more or less exclusively devices in which the developed deflections of a system capable of oscillating were measured as the effect of the unbalance of the body during rotation. Hence, the problem arose that the performance of a mass corrector in one balancing out plane of the rotating body had reactions in the other balancing out plane. The cause for this was that the determination of the out-of-balance action resulted once again at the bearing position transverse of the rotating body and not in the balancing plane. Hence, there were set up so-called centers of oscillations through the axial distribution of masses of the rotary body during oscillatory movement, which centers, in turn, were influenced by the inertia moment of the rotating body about its main axis of inertia oriented perpendicular to the direction of oscillation and to the axis of rotation.

In the case of the previously used so-called "resonant machine" wherein the unbalanced body was mounted by means of bearings on two vertically arranged springs or by resilient means enabling oscillation or vibration and at a predetermined speed setting up a resonance, there has been an attempt to solve the foregoing problem, in that the center of oscillation or the turning point is forced into the bearing planes. This occured because of the fact that alternately one bearing was restrained against free vibration while the other bearing could vibrate freely in resonance and serve as a measurement.

Since this solution did not fully compensate for the reaction, the rotary body was mounted by means of bearings in a framework for the resonance machine, and the framework, with axially adjustable torsion springs, could be so held that the center of vibration or oscillation became shifted into a balancing-out plane. Hence the balancing body could oscillate practically only with respect to the one balancing-out plane, that is to say, the only movement of the frame work to arise could still be developed now by the existing unbalance in the other plane. In this manner, the reaction from one plane was isolated from that in the other.

The resonance machine has not found much favor because of sharply rising demands for shorter balancing-out times and, above all, increasing demands for accuracy. By the development of methods using electrical measurements, mechanical oscillation pick-ups with dipping coils, requirements arose to measure electrically the vibratory or oscillatory movement as the effect of the imbalances of a rotating and not a balanced out rotary body, and, then undertake the determination of imbalance at constant speeds and nothing more. Since these devices brought on many advantages with respect to measuring time and accuracy and and measurements at high speed. They soon supplanted the resonant machines.

However, in these newer devices, there was still the problem of the influence of reaction from one balancing-out plane on the other. The useful solution in the case of the resonant machine having a frame work therein, vibratory at one point, became impossible in that restricting the frame in a balancing-out plane was not practically obtainable at high speed.

In meeting this problem, a potentiometric differential circuit for Baker (German Pat. No. 710,883) was of help because in it the reaction was compensated electrically in such a way that pick-up voltage components developed by oscillation at one bearing were superimposed on voltages picked up at the other bearing. This circuit, since it is electrically analgous to the mechanically acting frame, is still currently known as an "electric frame."

The so-called "Baker Circuit" functions accurately. It has only one main drawback. In it the adjustment settings must be carried out by manipulating a total of four potentiometers. This is based on the assumption that either a rotary body of like type free from imbalance (as it should become balanced out in the result) be already suitable for the results, or the results must become compensated in a first test run wherein out-puts, due to unbalancing action, from the oscillatory take-off are countered by alternating current voltages of equal value and opposite direction.

In the arrangement, these compensation voltages must be picked up or tapped from generators rotating in synchronous phase with the unbalanced body but whose out-put can be continuously varied in magnitude and phase angle.

If imbalance action of the resulting voltages in the oscillatory take-offs is compensated in a trial run, then a second trial run must be made with a known auxiliary imbalance with due regard to magnitude and direction in a perpendicular plane. From these two trial runs, two of the four potentiometers can be approximately set. After the described second trial run, the auxiliary imbalance in the one plane must be again removed and correspondingly be brought into the second balancing out plane. There upon, in a third trial run, the two remaining potentiometers in the Baker Circuit can be adjusted. In this third run, the compensating voltage can be varied to "electrical zero" with reversible direction or sign by the so set electric frame for the first time, that is to say, in this third test run, the out-of-balance can be measured correctly with respect to amount and location and essentially free from any back action.

This extremely complicated adjustment is justified only when there is a whole series of similar work pieces can be balanced out.

There were, therefore, situations studied in order to try to utilize Baker's Circuit without such adjustment tests. It was learned that the resultant dynamic action which is due to the axial mass distribution of the rotary body and its oscillatory rotary movement about an axis oriented perpendicular to the direction of oscillation and to the axis of rotation could have no effect on the regulator setting, provided the rotor ran limited against free vibration and if by means of fixed restraint of the bearing the rotor ran "vibration free" so to say.

It was determined from the next above finding that it is advantageous to depart from the measurement by means of the imbalance at the rotor bearings and resort to the measurement of the alternating forces developed by the imbalance. In contrast to the above described procedure during which the rotor bearings are held in a preferably horizontal direction for low tuned free oscillation, the rotor positions are held fixed by force producing devices and switching gear electrically operated force measuring sensors, that is to say, it becomes highly resonant. With this state of affairs, the rotor can carry out practically no oscillatory movements, within a rather high limit of speed ranges about the principal axis of inertia perpendicular to the axis of turning and to the measuring direction. With this the mass moment of inertia about this main axis of inertia, there is no longer any influence upon the vibratory properties of the rotor, and the setting of the four differential potentiometers in the Baker Circuit can follow according to the geometric dimensions of the rotor.

The acting imbalance in the two balancing-out planes produce corresponding reaction forces in bearing mounting, that is to say, in the planes of the bearings. If, in known manner, the sum of all forces and the sum of all moments were set to equal zero, and, by considering the geometric distance between the bearings and the balancing-out planes on the basis of measuring of the reaction forces on the bearings of the rotor according to magnitude and direction, then the collectively acting imbalances can be concentrated in the balancing-out plane.

For the setting of the differential potentiometers according to Baker Circuit based on these geometric distances, a socalled adjustment slide (German Pat. No. 976,886) was used. Later, electrical circuits enabling the direct setting of the potentiometer according the geometric distances between bearings and balancing-out planes were used. A development of the Baker frame circuit is the so-called A-B-C frame (German Pat. No. 962,474) wherein, for example A is the distance between the left bearing of the rotor and its left balancing-out planes, B the distance between the two balancing-out planes, and C the distance between the right balancing plane and the right bearing.

One proposal has been made heretofore for improving the next above device. The gear for the setting of Bakers required potentiometer is built directly on the bearing standards of the balancing-out machine and, by means of a toothed rack or cable line in combination with other potentiometers, is coupled with scales in the balancing-out planes and interacting mechanically so that the adjusting of the bearing standards and the scales gives the proper setting of the computing potentiometer. Such a scheme is shown in French Pat. No. 1,207,643. From a techinal standpoint, such a device would be difficult to make economically even if the reaction of one balancing in the other were compensated. The reason is that many pieces of complicated equipment which must be of high accuracy and tolerance are required.

The Baker system has yet another serious drawback. In that system, in order to isolate the effect of one plane from that on another, circuitry is used wherein the effect is to superimpose a portion of the signal current obtained at one bearing on that of the other bearing but with opposite sign. Now the two balancing-out planes move together narrowly in comparison with the bearing planes, in order that the measuring signal at one bearing become greater compensated by the partial signal from the other bearing. The result is that the sensitivity decreases with increasing moving together of the balancingout planes in comparison with the bearing planes, and that the two measuring signals in the extreme cases cancel out each other, that is to say, when distances between balancing-out planes is zero. This fact already interferes with the use of the Baker Circuitry on movement-measuring balancing machines.

Since for this machine, the amount of imbalance reading is experimentally adjusted, (assuming a sufficiently large amplifier in the out-put of the circuit) then in the case of relatively unfavorable ratios between distance between bearings and distance between balancing-out planes, an empirical setting for the potentiometer here can give the result that the imbalance can be shown as unity in practice.

In the case of force measuring machines, by which a direct reading of the imbalance in grams relative to the balancing-out planes should follow (and taking into account the effective radius) the Baker system is limited to a ratio of bearing spacing to balancing plane spacing of about 1:10 for favorable operation. If this ratio is exceeded, a direct reading in grams is not possible without setting test-runs. The advantage of presetting according to geometric measurements of the body out of balance is lost without these test runs.

BRIEF DESCRIPTION OF THE INVENTION

The invention has for its object the minimizing the above mentioned drawbacks of the prior art. The invention is a machine for dynamically balancing rotary bodies in which the forces on the bearing, due to imbalance of a rotating body to be measured, act through force translation means on force-sensing elements. The novelty includes the features and the force-sensing elements are so disposed opposite the effective or active positions of the forces of imbalance during rotation, and that the sensing-elements correspond to the effective forces of the forces of imbalance in the balancing planes.

In contrast to the prior art, there are no force measuring elements at the bearing for the unbalanced body, at which the forces of imbalance are effected, but are such positions within the machine, to which the effective forces correspond to each at the balancing planes. Since the balancing planes each can lie, according to the construction of the body to be balanced, at different locations, in a further development of the invention the force measuring elements are mounted slidable in such a way compared with the effective position of the forces of imbalance that they are adjustable to selective positions of the balancing planes.

A practical construction of such a machine is quite simple in that bearings, on which the rotary body is mounted, are disposed on a beam which translates the arising reaction forces on the bearings to the force measuring elements situated in the balancing planes.

The beam serves as an essentially fixed translation element. The force measuring elements are slidablely mounted longitudinally of the beam so as to be positioned at each selected balancing plane. The picking up or translating for sensing of the effective forces in the balancing planes themselves is economical and very simple in operation. The mounting of the bearings on a beam which conveys the forces to the force measuring elements is possible only up to a certain size of the balancing machine because the mechanical expenditure becomes too great. Also in situations where the machine would have excessive distance between bearings or high speed balancing out or where the diameter of the rotary body is so great than an offset bed would be necessary, building the beam directly in the machine would be too difficult.

When the size of the machine does not permit direct use of a beam, an external auxiliary device as a modification of the invention can be used with a balancing machine when the latter has electrically operating force measurers in the bearing blocks. Signals from the measurers are amplified and used to actuate force generators acting on a beam outside the balancing machine, and the reaction forces on the beam can be measured by force measuring elements mounted slidable with respect to the beam. The force measuring elements can then be brought into such positions at which the developed reaction forces correspond to the resulting forces in the balancing planes. Hence, this external auxiliary device can be scaled up larger or down smaller in dimension than the main part of the machine.

The force generator for actuating the external device may be in the form of electromagnetic, electrodynamic, magnetostrictive, piezo-electric systems. Inherent no-linearity of the relationship of force to signal is compensated by correctional amplifiers having distorsion characteristic of a reverse nature.

In the event the rotor body overhangs the bearings, rather than being between them, and tends to tip the beam, the action of one or obth of the force generators can be reversed, so they become sensors and sensors act as force generators.

DRAWING

DESCRIPTION OF THE PREFERRED EMBODIMENTS

Figure 1:
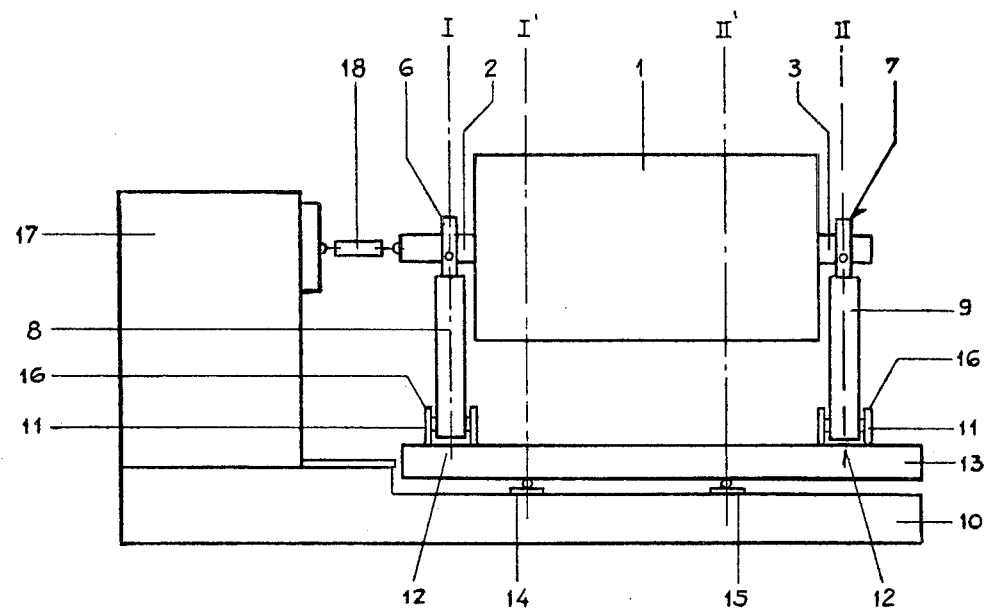
FIG. 1 is a front view of a form of the invention wherein the beam is within the machine.
Figure 2:
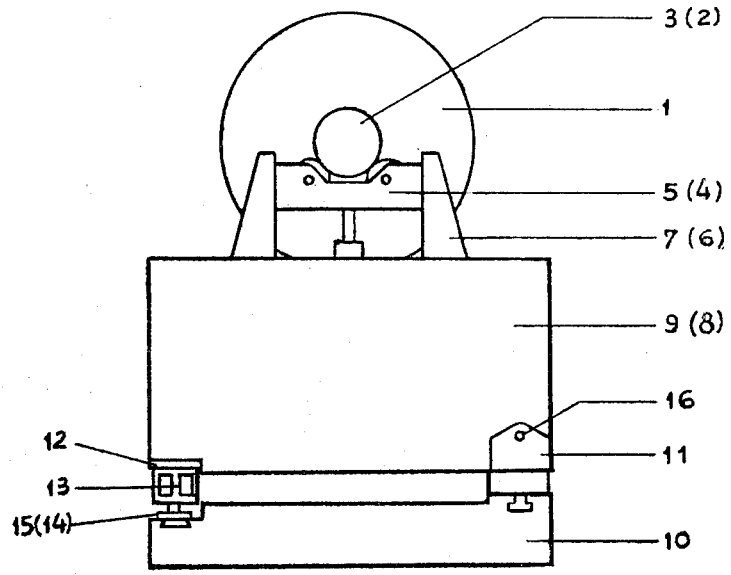
FIG. 2 is a side view of the invention as shown in FIG. 1.

In FIGS. 1 and 2 the out-of-balance rotor 1 is supported by two journals 2 and 3 on a pair of bearings 4 and 5. The bearing pairs are mounted on standards 6 and 7 on bearing blocks 8 and 9. The bearing blocks 8 and 9 are supported at one end by brackets 11 on the base 10 and the other end resting on knife edges 12, secured to a beam 13 which is supported by two force-measuring diaphragms 14 and 15 mounted on the base 10. The force measuring-diaphragms are adjustable to the balancing-out planes I' and II'. The bearing blocks 8 and 9 are connected without play to the brackets 11 by means of pre-tensioned torsion springs 16 so that they can develop a turning and/or pitching movement.

When the unbalanced rotor is driven by the flexible shaft 18 from the motor in the drive stand or box 17, the imbalances existing in the rotor act through the pair of bearing 4 and 5 and the standards 6 and 7 as alternating forces upon the bearing blocks 8 and 9. These alternating forces act in the bearing planes I and II, through the knife edges 12, on the stiff beam 13 which rests upon the arrangement of the force-measuring diaphragms or sensors 14 and 15.

The electrical signals from the force-measuring diaphragms 14 and 15 correspond exactly to the forces related to the equalizing planes I' and II'. The measuring equipment connected to force-measuring diaphragms can be obtained extraordinarily easily. It comprises beside, for each plane, an amplifier, for the measurement, sensitivity range changing switches, filter means, yet a single regulator serves for the adjusting of the equalizing radius. In order that force-measuring diaphragms correspond to the position of the equalizing or balancing-out planes can be adjusted, they are mounted slidable on the base 10, for example by the shown known dovetailing.

Figure 3:
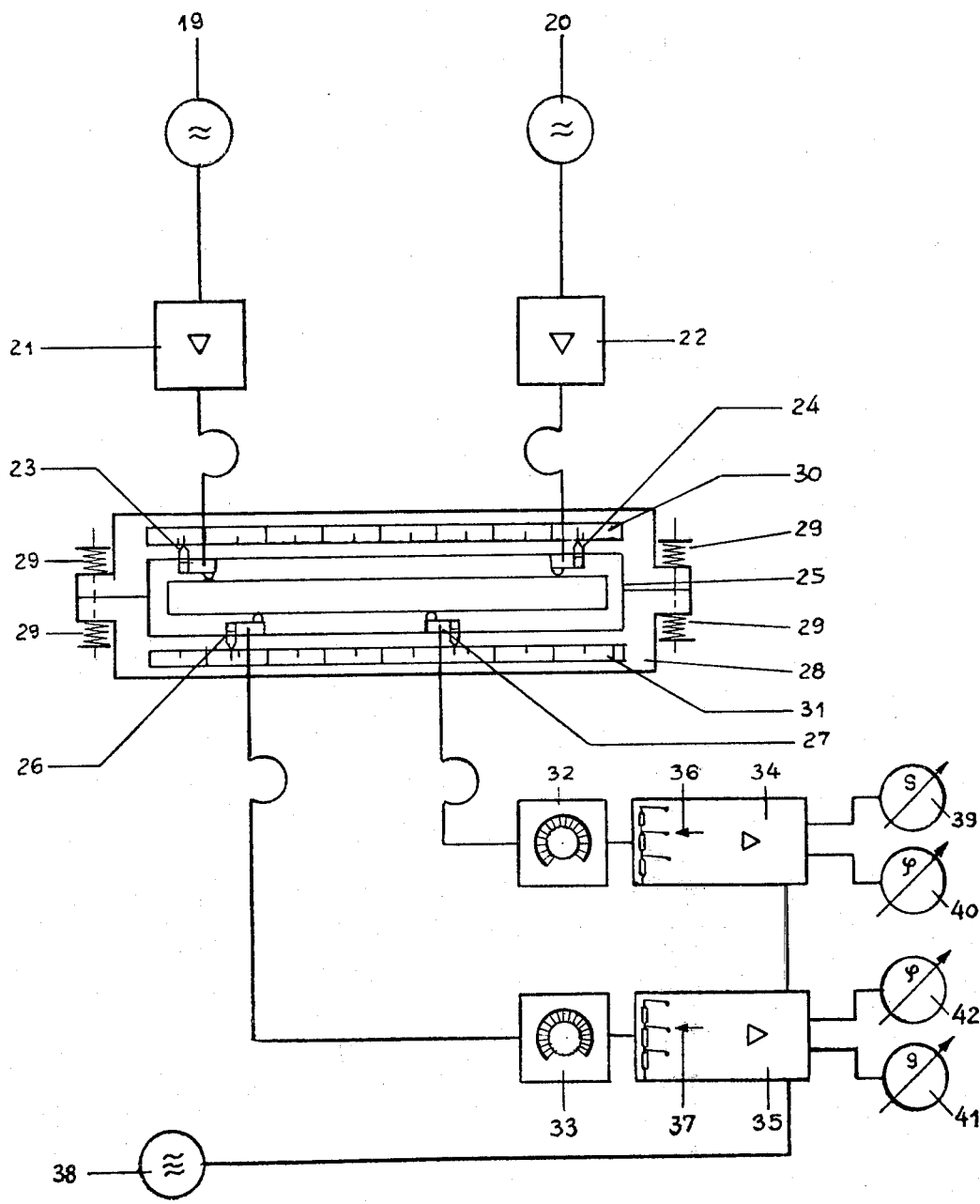
FIG. 3 shows an auxiliary beamed device situated outside the machine.

FIG. 3 shows the arrangement which operates with a beam outside the machine. Here the force measuring diaphragms 19 and 20 are integral in the bearing stands in conventional manner. Somewhat the same effect is obtained if the sensor 14 and 15 are under the knife-edges 12 in FIG. 1. The output signals from the two force-measuring diaphragms are amplified in amplifiers 21 and 22 and led through reversible alternator force exciters 23 and 24 to develop alternating forces on the beam 25. The beam 25 is supported by or on force-measuring diaphragms or sensors 26 and 27. The beam 25 as well as the exciters 23 and 24 and diaphragms 26 and 27 are included in a framing 28 held by elastic means. This framing 28 is made up of two parts for the purpose of easily adjusting or setting the alternating force producer and the force measuring means. The two parts are urged together by means of the tension springs 29 under an assumed existing force. The relative distances between the force producers 23 and 24 and force sensors 26 and 27 are geometrically analogous to the above characteristics due to mass on the rotor and balancing out machine. The frame 28 made up of the two urged together halves is provided with two scales 30 and 31 which show an increasing and decreasing suitable proportion (scale) to the machine. With the help of these scales and the provided indicators at the alternating force producers or the force measuring diaphragms, it is possible to get a correct setting in a simple manner. The output electrical signals from the force measuring diaphragms correspond exactly to the mentioned forces of imbalance in the balancing-out planes. These signals are then led to the radius controls 32 and 33 at which the radius on the rotor for attachment of weights for the balancing out is set. In amplifiers 34 and 35 there are measuring range changeover switches 36 and 37 as well as superimposing circuits serving as filters for the rotation frequency component, for example, a watt-meter circuit or circuits having keyed like direction.

The necessary drive signal for turning the rotor is picked off the phase generator 38. This phase generator can either be in the form of a full generator or merely a photo-electric element responding to the passage of a line on the rotor near the element. The impressed output signals as the result of this mixture in the amplifiers 34 and 35 are indicated as imbalance magnitude in grams g and position for adding (or subtracting) weight in angular degrees phi on the instruments 39 and 40 or 41 and 42 respectively.

Figure 4:
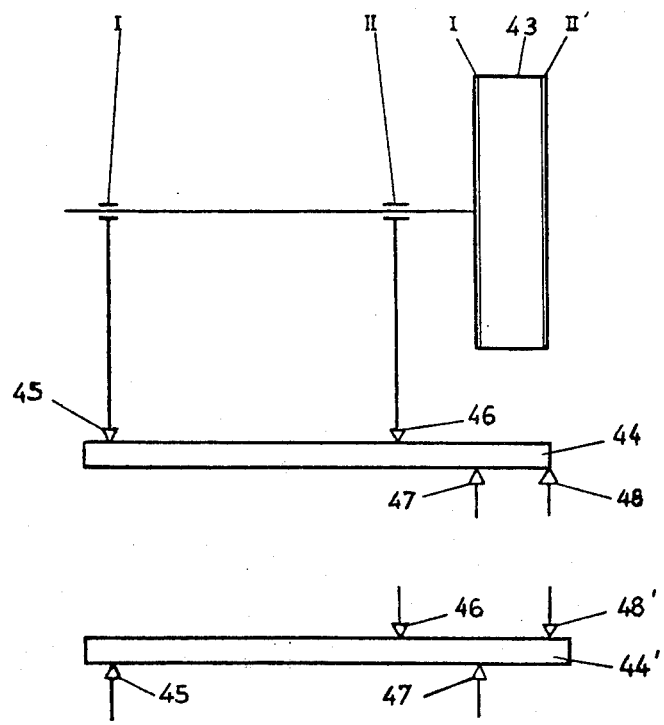
FIG. 4 shows an arrangement for a rotor body overhang the bearings.

FIG. 4 shows lastly the relationship during the balancing of over-hung rotors. The upper part of FIG. 4 shows symbolically the inertia body 43 with its two balancing-out planes I' and II' and the body mounted on bearings on the balancing out machine in planes I and II. If one should try to use this arrangement on the beam 44, the force generators 45 and 46 would act from the same direction and on the same side of the beam, while the reaction forces must be picked up by the force sensors 47 and 48. In this case, the beam would tilt and a measurement would not be possible. In this case, it would be logical to use a beam 44' outside the machine and reverse the force generator to a position 45' and the sensor 48 to a position 48' as a feature of the invention. This effect may be accomplished electrically by changing generator 45 to a sensor 45' and sensor 48 to a generator 48'. For this the electrical connection to the two must be exchanged. By this measure the necessary equilibrium can be obtained and a measurement made possible.

In operation, the machine according to FIG. 1 is run at constant speed by the motor 17 and out-puts from the sensors 14 and 15 are led to radius-setting means such as 32 and 33 in FIG. 3. The signals are analyzed for each balancing out plane I' and II' with respect to weight in grams to be added at the pre-selected radius and to angular position by a means 34 and 35 in much the same way as shown in U.S. Pat. No. 3,422,368 of Jan. 21, 1969.

Balancing-out planes may be varied merely by sliding the sensors 14 and 15 parallel with the axis of the rotor.

In the operation of the invention according to FIG. 3, the vibration exciters 23 and 24 are set correspond to the distance between bearings provided with pickups and the sensors 26 and 27 set for the balancing-out planes.

The invention is claimed in the following:

I claim:

1. A device for indicating correction in two spaced balancing-out planes for dynamically balancingout a rotating body comprising a pair of spaced bearings remote from the planes for supporting the body, means for rotating the body to subject the bearings to forces thereon as a result of inherent out-of-balance of the body, said planes being transverse to the axis of the rotation body, force measuring sensors in the respective planes, a floating beam in engagement with the sensors, transmitting means for transmitting said forces on the bearings to the beam and whereby said beam converts the forces on the bearings to forces corresponding thereto in the planes to aid in determining the amount of weight correction to be applied substantially in said planes to dynamically balance the body.

2. A device as claimed in claim 1, wherein said beam receiving the forces transmitted from said bearings at substantially two points of application on the beam with spacing corresponding to the distance between the bearings, whereby the sensor may measure reaction forces in said planes resulting from transmitted bearing forces on the beam at said points.

3. A device as claimed in claim 2, said sensors being movable along the length of the beam for selecting the balancing-out planes in which the correction is to be applied.

4. A device as claimed in claim 2, said transmitting means including means for converting force from the bearing to an electrical quantity, and means for converting the electrical quantity to force on the beam substantially analogous to that developed by the bearing.

5. A device as claimed in claim 4, the beam being remote from the bearing and out of mechanical connection therewith.

6. A device as claimed in claim 4, the means for converting the electrical quantity to force on the beam being a pair of transducers slidably mounted with respect to the length of the beam so that the distance between bearings may be varied and so that the same beam may be used with different mountings for the bearings.

7. A device as claimed in claim 2, said transmitting means being bearing blocks each having knife-edge means engaging on said substantially points of application respectively.

8. A device as claimed in claim 2, the sensors being under the beam and the beam and the transmitting means being above the beam.

9. A device as claimed in claim 2, one sensor being in engagement with one face of the beam and the other sensor being in engagement with the opposite face, and the transmitting means from the bearings acting on opposite faces of the beam, so that if the rotary center of gravity of the body is not between the bearings the beam will not tend to become tilted.

10. The method of indicating correction in two spaced balancing-out planes for dynamically balancing-out a rotating body comprising the steps of rotatably supporting the body at spaced points remote from said planes, rotating the body to subject said rotatable supports to forces resulting from the out-of-balance of said body, positioning force measuring sensors in said planes, transmitting said forces from said supporting means to said sensors and translating said forces to forces corresponding thereto in the planes to aid in determining the amount of weight to be applied in said planes to dynamically balance the body.

* * * * *